July 4, 1967   J. H. AUER, JR., ET AL   3,329,932
ULTRASONIC VEHICLE DETECTION SYSTEM
Filed July 22, 1964   3 Sheets-Sheet 1
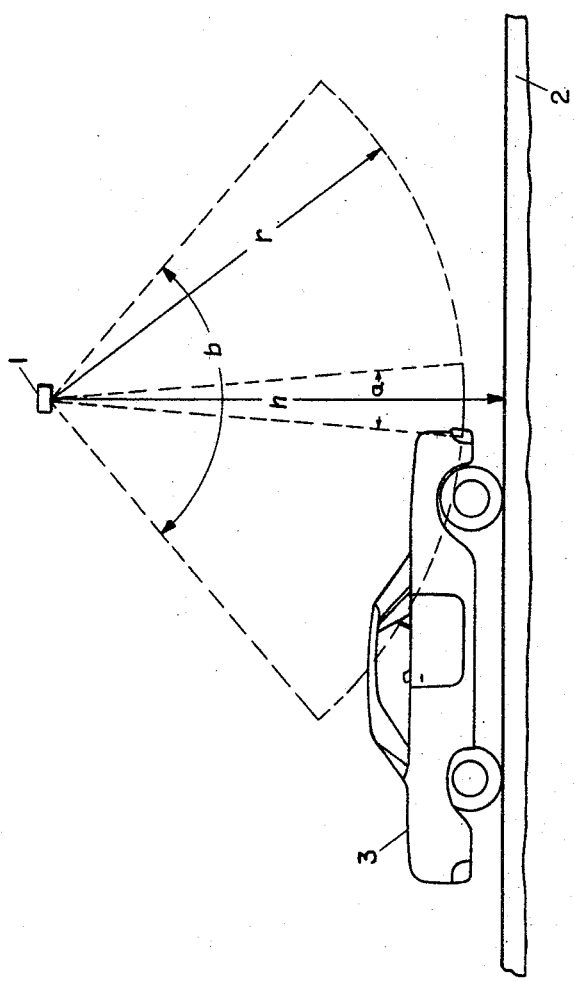
FIG. I
INVENTORS
J.H.AUER JR. AND
BY   L.A.ROSS
*Forest B. Hitchcock*
THEIR ATTORNEY

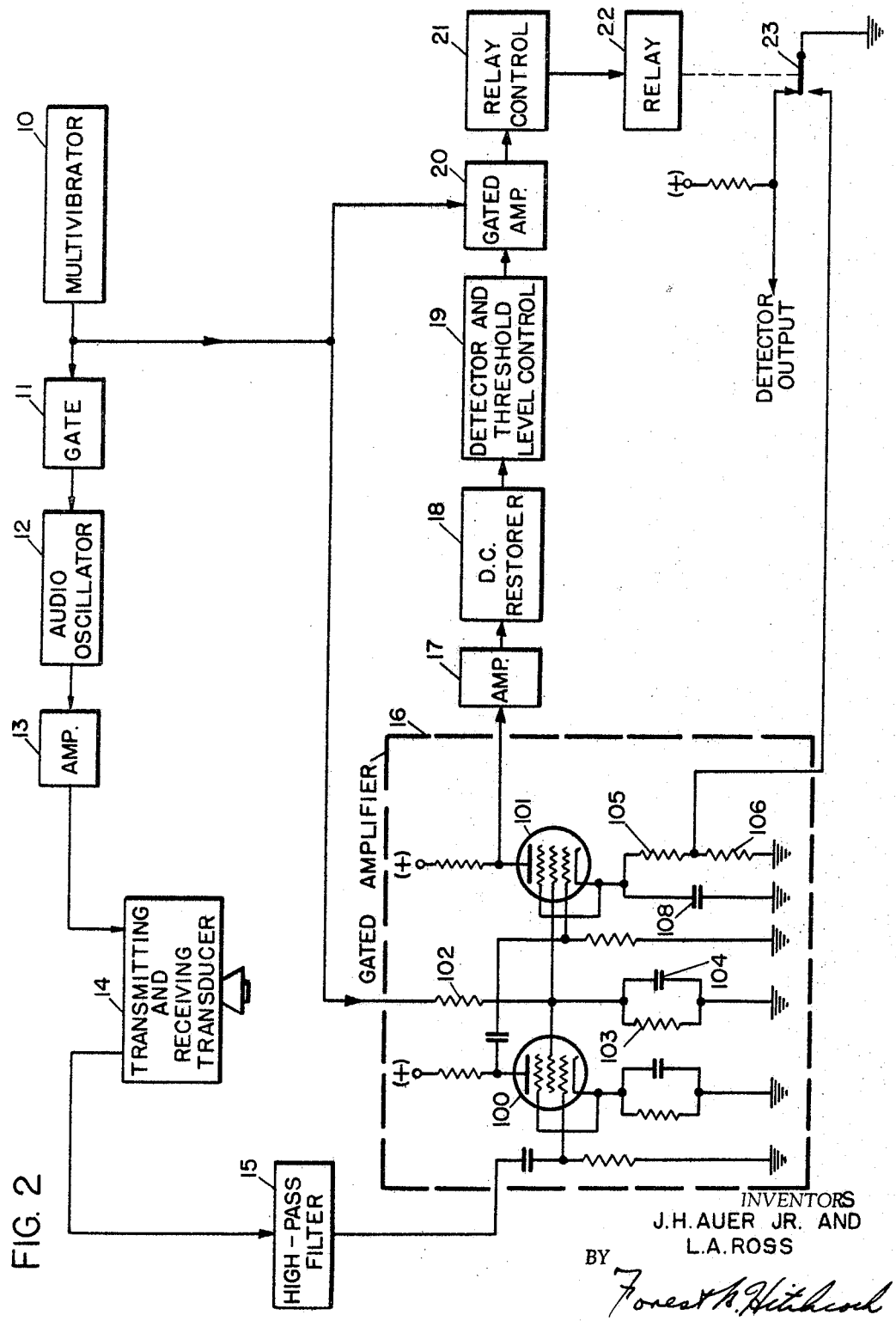

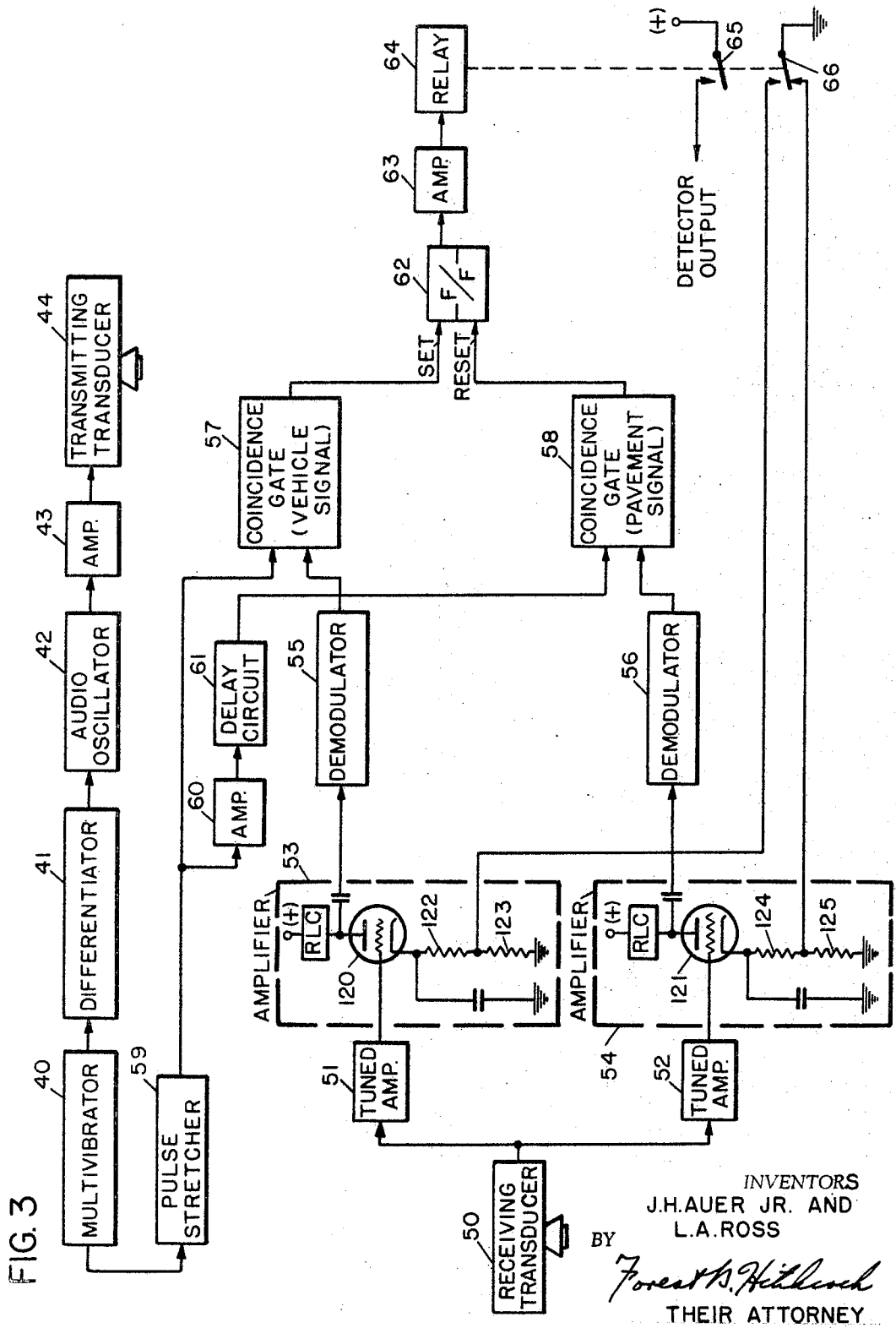

United States Patent Office 3,329,932
Patented July 4, 1967

3,329,932
ULTRASONIC VEHICLE DETECTION SYSTEM
John H. Auer, Jr., Fairport, and Lyle A. Ross, Rochester, N.Y., assignors to The General Signal Corporation, Rochester, N.Y., a corporation of New York
Filed July 22, 1964, Ser. No. 384,292
2 Claims. (Cl. 340—38)

ABSTRACT OF THE DISCLOSURE

A system for detecting vehicles in which a transducer directs ultrasonic energy across the path of a moving vehicle. The reflected ultrasonic energy from the vehicle is sensed by an ultrasonic transducer and amplified. When the reflected energy is of proper magnitude and coincident with predetermined intervals, detection of a vehicle is indicated by the switching of an electromechanical relay. Once detected continued detection is assured by increasing the gain of the receiving amplifier. Thus, loss of detection caused by variations of amplitude in the received signal is obviated. The amplifier gain is altered by shorting out part of the cathode resistance of the receiver amplifier through the contacts of the electromechanical relay.

This invention relates to detection of objects by ultrasonic means, and more particularly to an ultrasonic vehicle detection system for positively producing a single output manifestation for each vehicle in a stream of traffic.

Systems utilizing pulsed ultrasonic energy for detection of vehicles have been widely employed in traffic monitoring and control apparatus. In a typical detection system, short pulses of vibrational or compressional wave energy, preferably within the ultrasonic region, are produced by a transmitting transducing means, and directed at a roadway. These energy pulses are reflected back to a receiving transducing means from the roadway surface, but are gated out of the system so as to have no effect upon the output of the system. However, in the presence of a vehicle or object on the roadway within range of the transmitted energy pulses, the energy pulses are reflected generally from the upper surfaces of the vehicle to the receiving transducing means. The system responds to these pulses by producing an output manifestation thereof. The detection system thus indicates presence of a vehicle or object on the roadway whenever the vehicle or object returns a sufficiently strong reflection to the receiving transducing means. Accordingly, such systems have been used extensively in vehicle counting applications. Typical systems of this general type are shown in H. C. Kendall et al. Patents 3,042,303 and 3,042,899, both issued July 3, 1962, and J. H. Auer, Jr., Patent 3,045,909 issued July 24, 1962, as well as in handbook VTC 108 entitled, "Ultra-Sonic Vehicle Detector Types STD–1, STD–2," and handbook VTC 119 entitled, "Ultra-Sonic Vehicle Detector Type SVDT 2," both of which are available from the instant assignee.

However, the output relay of such detection systems has heretofore displayed a tendency to "stutter" when detecting moving vehicles; that is, the relay is actuated more often than once per detected vehicle. This condition may be caused by a number of factors, such as air disturbance, temperature changes, vehicle contours, different sonic absorption qualities of materials used in vehicles, as well as other, more obscure factors.

One reason for the output relay "stutter," which becomes more pronounced as speed of the detected vehicles decreases, may be seen by considering progress of a vehicle as it moves into range of the transmitted energy pulses. This vehicle may at first present a highly reflective surface contour to the transmitted energy, resulting in a reflection to the receiving transducer means of sufficient strength to actuate the detection system. As the vehicle progresses, it may next present a poorly reflective surface contour to the transmitted energy, resulting in substantial absence of a reflected signal at the receiving transducer means for an interval of sufficient duration to deactuate the system. As the vehicle moves further, it may again present a highly reflective surface contour to the transmitted energy, causing reflection of a second strong signal to the receiving transducer means, again actuating the detection system. A similar effect might be noted if the vehicle presents different materials to the transmitted energy as it progresses through the field of dispersed energy, due to different sonic absorption qualities of the different materials.

Another factor causing the detection system output relay to "stutter" may be air movements. That is, when a vehicle is within the detection zone "fringe area" and has initially actuated the system with a reflected vibrational energy signal, a momentary air disturbance may shift the volume of air conducting a major portion of the vibrational energy, to a location where the receiving transducer means can no longer receive a sufficient amount of this energy, thus deactuating the detector. However, when the air disturbance subsides, a strong reflected signal may be received by the receiving transducer means, again actuating the system. In this fashion, a single, slow moving vehicle may often produce two output relay actuations, or perhaps even more than two.

Still another factor causing the detection system output relay to "stutter" may be due to localized atmospheric temperature variations. Because vibrational energy travels at different speeds through the atmosphere, depending upon atmospheric temperature, round trip transit time of emanated energy pulses reflected from detected vehicles varies accordingly. Thus, as temperature increases, round trip transit time for any given distance decreases, and the vehicle detection system becomes effective over an increased distance from the transducer means. Conversely, as atmospheric temperature decreases, the system is effective over a decreased distance from the transducer means. Although atmospheric temperatures are not likely to change abruptly, air in the immediate vicinity of the detection zone may actually undergo abrupt temperature changes due to passage of vehicles emanating engine heat or momentarily blocking heat radiation from pavement heated by action of the sun. Thus, a slow-moving vehicle may actually be in and out of range of the transducer means more than once, causing the detection system to erroneously register passage of more than one vehicle.

The present invention is intended to overcome the aforementioned problem associated mainly with detection of slow moving vehicles. This is accomplished by controlling the gain of the receiver in accordance with detection of each separate vehicle. Accordingly, initial detection of each vehicle results in increased receiver gain, effectively widening the detection zone to ensure positive vehicle detection.

The invention generally contemplates an improved vehicle detection system comprising receiving amplifier means and means controlling gain of the receiving amplifier means in accordance with each detected vehicle, whereby detection of each vehicle results in increased receiving amplifier gain during the entire interval of detection of the vehicle. The increased gain is achieved by decreasing cathode resistance in a receiving amplifier stage, thereby lowering cathode bias on an electron discharge device comprising this stage. When the vehicle leaves the detection zone, the cathode resistance is again increased, thereby again lowering the gain of the amplifier stage. Additional and removal of the cathode resistance is achieved by open-circuiting and short-circuiting a portion of the cathode resistance in the receiving amplifier stage, respectively.

One object of this invention is to provide a highly reliable system for detection of vehicles or objects which is independent of variations in reflectivity to vibrational energy pulses in each of the vehicles or objects to be detected.

Another object of this invention is to provide a system for detection of vehicles or objects which is independent of shape of the vehicle or object to be detected.

Another object is to provide a system for detection of vehicles or objects which is independent of atmospheric disturbances in the vicinity of the detection zone.

Another object is to provide a system for detection of vehicles or other objects which is independent of the speed at which the vehicle or object moves through the detection zone.

These and other objects and advantages of the invention will become apparent from the following detailed description when read in conjunction with the accompanying drawing, in which:

FIG. 1 is an illustration of vehicle detection by use of ultrasonic energy pulses.

FIG. 2 is a part block and part schematic diagram of an ultrasonic vehicle detection system incorporating one embodiment of the invention.

FIG. 3 is a part block and part schematic diagram of an ultrasonic vehicle detection system incorporating a second embodiment of the invention.

Turning first to FIG. 1, there is shown a transducer means 1 at a height above a roadway 2. The transducer means generates discrete compressional wave or vibrational energy pulses, directing this energy toward the roadway in a substantially conical pattern. When no vehicle is present within a sector defined by an angle $a$ at a distance $r$ from the transducer means, the vibrational energy pulses are reflected from the pavement back to the transducer means. Distance $r$ may be defined as the range of the transducer means, and must be less than distance $h$. The sector defined by angle $a$ and distance $r$ may be considered the narrow detection zone.

When a vehicle 3 penetrates into the narrow detection zone, the gain of a receiver circuit responsive to the transducer means is increased, effectively widening the detection zone from the sector defined by angle $a$ and radius $r$ to a sector defined by angle $b$ and radius $r$. It can be seen that the widened detection zone almost completely engulfs the vehicle, assuring positive detection, even though distance $r$ may be varying somewhat, due to temperature changes, or other reasons. Output relay "stutter" is thus prevented. When the vehicle subsequently vacates the widened detection zone, the gain of the receiver circuit is reduced to its original value, and the detection zone is effectively narrowed once more to the sector defined by angle $a$ and radius $r$.

Turning now to FIG. 2, there is shown a free-running multivibrator 10 which establishes a repetition rate for the transmitted vibrational energy pulses. Output pulses produced by the multivibrator are supplied to a normally-closed gate 11 which, in turn, controls operation of an audio oscillator 12, preferably operating at an ultrasonic frequency. The circuitry of gate 11 is fully disclosed in the aforementioned Kendall et al. Patent 3,042,899. While gate 11 is closed, audio oscillator 12 is prevented from oscillating. However, once for each cycle of the free-running multivibrator, the gate is opened for a brief interval, during which audio oscillator 12 produces its output signal. Each ultrasonic pulse so generated is supplied to a transmitting and receiving transducer 14 through an amplifier 13. Consequently, repeated ultrasonic energy pulses are directed by this transducer toward the objects or vehicles to be detected.

Each transmitted pulse is reflected either from the roadway or from the object or vehicle intended to be detected on the roadway. The reflected ultrasonic energy pulses act upon transducer 14 and cause it to provide corresponding electrical pulses to a high-pass filter 15, which tends to limit any low frequency components of the reflected vibrational energy. Output voltage produced by the high-pass filter is capacitively coupled to the control grid of an electronic tube 100 connected as an amplifier and comprising the first stage of a gated amplifier 16. The gated amplifier effectively disables the portion of the system normally responsive to received pulses, whenever a pulse is transmitted. This protects the receiving portion of the system from damage which would otherwise be caused by coupling of the high power transmitted pulses into this portion of the system.

The screen grid of electronic tube 100, and the screen grid of an electronic tube 101 comprising the second amplifier stage of gated amplifier 16, which is resistance-coupled to the first stage, are both gated through a resistor 102, which receives negative-going pulses from multivibrator 10. The screen grids are also connected through a resistor 103 and parallel capacitor 104 to ground, so as to make voltage changes at the screen grids more gradual as multivibrator 10 operates between its opposite conditions. This prevents introduction of additional undesired transients in the plate currents of tubes 100 and 101. Moreover, the gating voltage applied to the screen grids is maintained during the entire interval in which the ultrasonic pulse is transmitted, and for some additional time, during which the spurious voltages within the circuit are rapidly decaying. Thus, during the interval of transmission plus the aforementioned time immediately following, both stages of gated amplifier 16 are rendered ineffective, thereby reducing the amplitude of the aforementioned spurious voltages.

It will be noted that cathode bias is employed in both stages of gated amplifier 16. In particular, cathode bias for the tube 101 may be developed across a pair of series-connected cathode resistors 105 and 106 which are by-passed to ground by a capacitor 108. The point common to resistors 105 and 106 is connected to a back contact 23 of an output relay 22. The heel of contact 23 is grounded. Cathode bias for amplifier stage 101 is developed across resistors 105 and 106 in series, provided relay 22 is energized. However, during the time at which relay 22 is de-energized, cathode bias for amplifier stage 101 is developed solely across resistor 105. Those skilled in the art will recognize that when cathode bias is developed solely across resistor 105, the gain of amplifier stage 101 is greater than when cathode bias is developed across resistors 105 and 106 in series.

Output voltage from gated amplifier 16, which is provided by amplifier stage 101, is coupled to an amplifier 17, which further amplifies the received signals. The output of amplifier 17 is supplied to a D.C. restorer 18, the output of which, in turn, is applied to a detector and threshold level control 19. The purpose of D.C. restorer 18 and detector and threshold level control 19 is to provide means for rendering the output voltage responsive only to received signals having an amplitude above a predetermined value, in order to provide distinction between received signals reflected from vehicles and received signals reflected from other objects or from people.

Output voltage produced by detector and threshold level control circuit 19 is supplied to a gated amplifier 20 which is gated by output voltage of multivibrator 10 in a fashion similar to that described for gated amplifier 16. Here, the purpose of gating amplifier 20 is to reject all reflected signals acting on transducer 14 during the time of pulse transmission and immediately thereafter. The output of gated amplifier 20 is coupled to a relay control 21, which controls energization of its associated relay 22.

The relay control may be so organized that continuous reception of reflected pulses from vehicles or objects to be detected will cause the relay to remain deenergized as long as such pulses are received at a repetition rate above a predetermined minimum. This produces an output manifestation of such detection from front contact 23 of the relay. Failure to receive a reflected pulse during a predetermined interval causes relay control 21 to energize relay 22. The length of this interval is determined by the valves of circuit components comprising the relay control. The relay control circuit is fully disclosed in aforementioned Kendall et al. Patent 3,042,899.

In a preferred mode of operation, the operating frequency of multivibrator 10 is selected such that a pulse of vibrational energy is transmitted by transducer 14 each time a pulse of vibrational energy reflected by the pavement is received by transducer 14. This prevents pulses reflected by the pavement from actuating relay 22, since gated amplifier 20 is gated "off" in synchronism with multivibrator 10. However, when vibrational energy is reflected from the surface of a vehicle, the reflected pulse is received by transducer 14 at some time other than that at which multivibrator 10 provides an output pulse. At this time, gated amplifier 20 permits the received pulse to be transferred to relay control 21, thereby deenergizing relay 22. In this manner, therefore, relay 22 remains energized when vibrational energy pulses produced by transducer 14 are reflected from the surface of a roadway; however, when these vibrational energy pulses are reflected from the surface of a vehicle, relay 22 is deenergized, and remains deenergized for as long as the received vibrational energy pulses are reflected from the surface of the vehicle. However, after the vehicle has left the detection zone, vibrational energy pulses received by transducer 14 again are those which result in no energy being transferred to relay control 21, and relay 22 is thereupon energized. Each opening of front contact 23 of the relay provides a positive output voltage pulse therefrom, indicative of a vehicle detection.

When a vehicle is detected, a predetermined amount of gain attenuation, such as 20 db, is removed, effectively widening the detection zone. The gain attenuation is reinserted when the vehicle vacates the detection zone, and is no longer detected. Thus, prior to detection of a vehicle, the detection system operates with low gain, and it is necessary for a vehicle to penetrate the ultrasonic beam to a substantial degree, in order to be detected. However, when detection occurs, the effective detection zone is expanded. Because the vehicle being detected at this time is well within the widened zone, no "stuttering" of relay 22 can occur. Moreover, it is necessary for the vehicle to move far enough so as to vacate the effectively widened detection zone before relay 22 is again energized, indicating that the vehicle has departed. When the relay is thus energized, it reintroduces attenuation in amplifier stage 101, effectively reducing the detection zone to its narrow size. Since the vehicle is well removed from the narrowed zone at this time, no tendency to "stutter" exists.

FIG. 3 is a representation of the invention as used in a vehicle detection system which responds to signals reflected from the pavement when no vehicle is present, as well as signals reflected from a vehicle in the event a vehicle is present. The system comprises a free-running multivibrator 40 which establishes a repetition rate for the transmitted vibrational energy pulses. The multivibrator provides a pair of output signals, each signal comprising negative pulses. These pulses are produced alternately at either output of the multivibrator, in a manner well known in the art. Negative pulses produced on a first output phase of multivibrator 40 are differentiated in a differentiator circuit 41, to form a negative trigger pulse for an audio oscillator 42, preferably operating at an ultrasonic frequency. Oscillation takes place only during the time this negative trigger pulse is present at the input to the audio oscillator. Ultrasonic energy thus produced by audio oscillator 42 is supplied to a transmitting transducer 44 through a power amplifier 43. Consequently, repeated ultrasonic energy pulses are directed by transmitting transducer 44 toward the objects or vehicles to be detected.

Each transmitted pulse is reflected either from the roadway or from the object or vehicle intended to be detected on the roadway. The reflected ultrasonic energy pulses act upon a receiving transducer 50 and cause it to provide corresponding electrical pulses to a pair of tuned amplifiers 51 and 52, each of which is tuned to the ultrasonic frequency generated by audio oscillator 42. By utilizing tuned amplifiers, spurious received frequencies are rejected.

Output of tuned amplifier 51 is supplied to a tuned amplifier stage 53, while output of tuned amplifier 52 is supplied to a tuned amplifier stage 54. Tuned amplifier stages 53 and 54 each have substantially identical gain. Amplifier stage 53 comprises an electronic tube 120, while amplifier stage 54 comprises an electronic tube 121. The anode circuit of each of tubes 120 and 121 comprises a tuned tank circuit in parallel with a plate load resistance, and is designated RLC. The cathode resistance of tube 120 comprises a pair of series-connected resistors 122 and 123, while the cathode resistance of tube 121 comprises a pair of series-connected resistors 124 and 125. The anode of tube 120 is capacitively coupled to a demodulator 55, while the anode of tube 121 is capacitively coupled to a demodulator 56. Output signals produced by demodulator 55 are coupled to a first input of a coincidence gate 57, while output signals produced by demodulator 56 are coupled to a first input of a coincidence gate 58. It should be noted that the output signals produced by demodulators 55 and 56 comprise the envelope of the reflected ultrasonic signals.

A pulse stretcher 59 is coupled to the second output phase of multivibrator 40, and provides widened negative pulses in response to narrower negative pulses produced on the second phase of multivibrator 40. These widened negative pulses are supplied to a second input of coincidence gate 57. In addition, these widened negative pulses are also supplied through an amplifier 60 to a delay circuit 61, which delays occurrence of each widened negative pulse at its output, prior to supplying this pulse to a second input of coincidence gate 58. Output signals produced by coincidence gate 57 when both inputs are fulfilled are supplied to a SET input of a flip-flop circuit 62, while output signals produced by coincidence gate 58 when both its inputs are fulfilled are supplied to a RESET input of flip-flop circuit 62. Output signals produced by flip-flop circuit 62 are coupled through an amplifier 63 to operate an output relay 64 having a pair of contacts 65 and 66. Closure of front contact 65 produces the detector output signal, indicating detection of a vehicle. Closure of front contact 66 short-circuits cathode resistor 123 of amplifier 53, while closure of back contact 66 short-circuits cathode resistor 125 of amplifier 54.

In operation, therefore, the first phase output pulses provided by multivibrator 40 produce repetitive bursts of ultrasonic energy from audio oscillator 42, which drives transmitting transducer 44 accordingly. In this fashion, repetitive ultrasonic pulses are directed toward the roadway. In the event no vehicle is present on the roadway, relay 64 is deenergized, and ultrasonic vibrational energy pulses are received by transducer 50 and supplied through tuned amplifiers 51 and 53 in series to demodulator 55, and through tuned amplifiers 52 and 54 in series to demodulator 56. Since relay 64 is denergized at this time, resistor 125 in amplifier stage 54 is short-circuited, so that the gain of amplifier stage 54 becomes considerably greater than the gain of amplifier stage 53, in a manner previously described. Hence, the amplitude of voltage produced by demodulator 56 is considerably greater than the amplitude of voltage produced by demodulator 55.

The transmitting and receiving transducers are situated above the pavement at a predetermined distance, such that the round-trip transit time of each ultrasonic pulse from transmitting transducer 44 to the pavement and back to receiving transducer 50 causes production of output pulses from the demodulators simultaneously with production of the output pulse from delay circuit 61. Hence, coincidence gate 58 energizes the RESET input of flip-flop circuit 62, causing relay 64 to remain de-energized. Moreover, because the gain of amplifier stage 54 is considerably greater than the gain of amplifier stage 53 under these conditions, the circuit is far more sensitive to pulses reflected from the pavement than pulses reflected from a vehicle. Therefore, there exists a very small effective detection zone in which a vehicle may initially be detected.

Assume now that a vehicle penetrates the effective detection zone. At this instant, the round-trip transit time of vibrational energy pulses from transmitting transducer 44 back to receiving transducer 50 is decreased, due to the decreased distance between the transducers and the reflecting surface. Therefore, output pulses are produced by demodulators 55 and 56 simultaneously with the widened output pulses produced by pulse stretcher 59. Both inputs to coincidence gate 57 are thus fulfilled, thereby energizing the SET input of flip-flop circuit 62. This causes energization of relay 64, which produces a detector output indication, and simultaneously removes the short-circuit from across resistor 125 and instead short-circuits resistor 123. Hence, the gain of amplifier stage 54 is decreased considerably, while the gain of amplifier stage 53 is increased considerably. This produces a widening of the effective vehicle detection zone, in a manner previously described, while simultaneously weakening any reflections from an area of pavement not covered by the vehicle. Thus, once detected, the vehicle is immediately engulfed by the widened effective detection zone, while the area of pavement which would reflect signals of significant strength to the receiving transducer is left uncovered by the vehicle is effectively narrowed. These factors combined to obviate the possibility of relay "stutter."

Once the vehicle has vacated the widened detection zone, pulses are no longer reflected from the vehicle. Therefore, pulses reflected from the narrowed area of roadway only are once again received by receiving transducer 50. Both inputs to coincidence gate 58 are thus fulfilled, while only one input to coincidence gate 57 is fulfilled. Flip-flop 62 is thus switched to its RESET condition, deenergizing relay 64. This lowers the gain of amplifier stage 53 and raises the gain of amplifier stage 54, narrowing the effective detection zone to its original size. The system is thus ready to detect a subsequent vehicle.

Thus, there has been shown a circuit for eliminating "stutter" of an ultrasonic vehicle detection system, such as that often encountered upon detection of slow moving vehicles. The circuit is reliable, easy to maintain, and requires but a minimum of components to be added to prior ultrasonic vehicle detection system to render them capable of altering the effective size of the detection zone in accordance with detection of each vehicle. The circuit, moreover, may also be used in the receiver portion of ultrasonic receiving transducers, as well as in those comprising as combined transmitting and receiving transducer.

Although but one embodiment of the invention has been described, it is to be specifically understood that this form is selected to facilitate in disclosure of the invention rather than to limit the number of forms which it may assume; various modifications and adaptations may be applied to the specific form shown to meet requirements of practice, without in any manner departing from the spirit or scope of the invention.

What is claimed is:

1. A system for detecting vehicles by sensing vibrational energy pulses reflected therefrom, comprising in combination, a single sonic transducer for transmitting vibrational energy across the path of said vehicles during selected transmitting intervals and for producing output voltages in response to receive reflections of said energy, tuned amplifier means having cathode feedback resistors coupled to said transducer for increasing the amplitude of said output voltage during selected receiving intervals, threshold level control means for producing a signal whenever the output of said tuned amplifier exceeds a predetermined level during said selected receiving intervals, free-running multivibrator means coupled to said transducer and said tuned amplifier and said threshold level control means for providing voltage outputs to control the rate of said selected transmitting and receiving intervals, relay control means responsive to said signal for producing output energy whenever said signal is absent for longer than a preseletced period, and relay means responsive to said relay control means for giving a distinctive indication of vehicle presence and for changing the resistance of said cathode resistors so as to increase the gain of said tuned amplifier whenever said relay control means ceases to produce output energy.

2. A system for detecting vehicles by sensing vibrational energy pulses reflected therefrom comprising in combination, a first sonic transducer for transmitting vibrational energy across the path of said vehicles during selected transmitting intervals, a second sonic transducer for producing output voltages in response to reflected energy, a first and a second tuned amplifier means each electrically coupled to said second sonic transducer for increasing the amplitude of the output voltage of said second sonic transducer, cathode feedback resistor means located in both first and second tuned amplifier means for controlling the gain of said first and second tuned amplifiers, a first and second coincidence gate means coupled to said first and second tuned amplifiers respectively for producing signal outputs in response to the output voltages produced by said first and second tuned amplifier means during first and second selected intervals respectively, free-running multivibrator means coupled to said first sonic transducer and said first and second coincidence gates for determining the rate of said selected transmitting intervals and said first and second selected intervals, a bistable circuit means responsively coupled to said first and second coincident gate means for producing a change in level of its output signal in accordance with the occurrence of output signals from said first and second coincident gate means, and relay means coupled to said bistable circuit means for producing a distinctive indication of vehicle presence in response to an increase in the level of output signal of said bistable circuit means and for reducing the resistance of said cathode feedback resistors of the tuned amplifier means associated with the coincidence gate means producing said change in level of said bistable circuit means output signal.

References Cited

UNITED STATES PATENTS 3,255,434  6/1966  Schwarz _____ 340—38

NEIL C. READ, *Primary Examiner.*

THOMAS B. HABECKER, *Examiner.*